F. B. CONVERSE.
COLLAPSIBLE CORE.
APPLICATION FILED JULY 24, 1916.
1,281,522.
Patented Oct. 15, 1918.
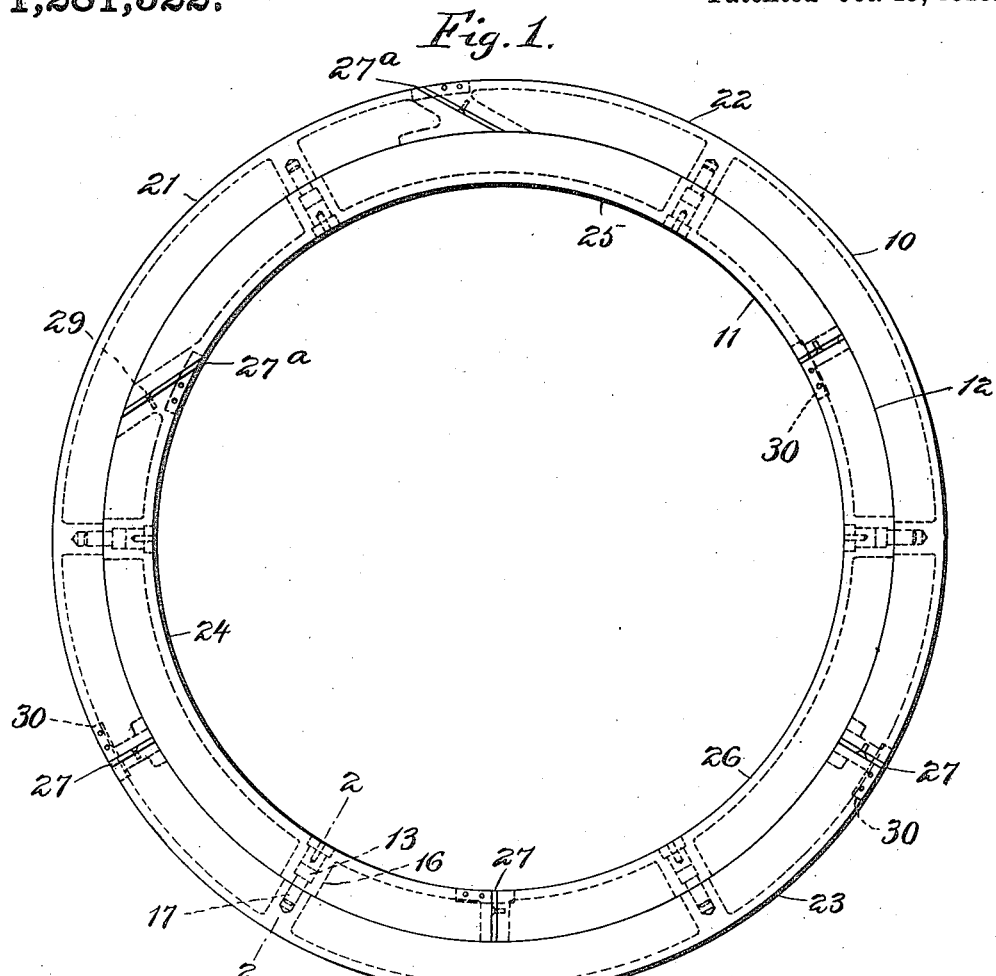
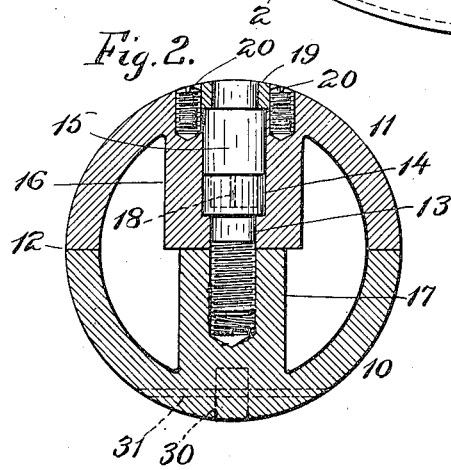
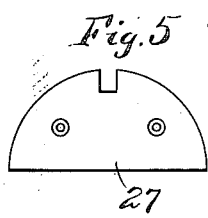
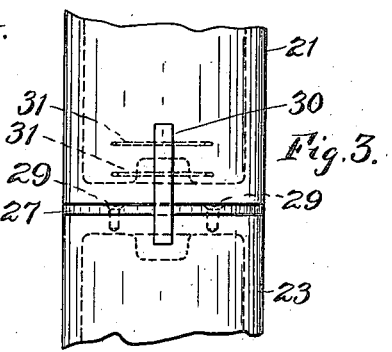
INVENTOR.
F. B. Converse
BY
Robert M. Pierson
ATTORNEY

UNITED STATES PATENT OFFICE.

FRANCIS B. CONVERSE, OF AKRON, OHIO, ASSIGNOR TO THE B. F. GOODRICH COMPANY, OF NEW YORK, N. Y., A CORPORATION OF NEW YORK.

COLLAPSIBLE CORE.

1,281,522.  Specification of Letters Patent.  Patented Oct. 15, 1918.

Application filed July 24, 1916. Serial No. 110,841.

*To all whom it may concern:*

Be it known that I, FRANCIS B. CONVERSE, a citizen of the United States, residing at Akron, in the county of Summit and State of Ohio, have invented certain new and useful Improvements in Collapsible Cores, of which the following is a specification.

This invention relates to a collapsible annular core or mandrel adapted to be used in the manufacture of pneumatic tire casings, and its particular object is to furnish a core which may be used in making cord tires by the method of wrapping the cord layers completely around the core, the latter being of such construction that it may be formed and machined at a minimum expense, assembled into a rigid annular structure adapted for the purpose mentioned, and readily disconnected and removed in sections from the interior of the tire after the latter has been split open around its inner circumference.

Of the accompanying drawings,

Figure 1 represents a side elevation of a tire-forming core constructed according to my invention.

Fig. 2 represents a cross-section on a line such as 2—2 in Fig. 1 through one of the securing bolts.

Fig. 3 represents an outer face view at one of the joints.

Fig. 4 represents a detail plan view of one of the bolt-retaining rings.

Fig. 5 represents a face view of one of the filler or wear plates.

The core is cast hollow for the sake of lightness, and is made substantially circular in cross-section to conform with the inner contour of a tire casing and to enable the cords or other carcass elements to be wrapped completely around said core in the process of manufacture, the carcass being then split circumferentially around the middle of its inner periphery.

The core, as shown, is composed of concentric outer and inner rings, halves or sections 10, 11 divided along a median circumferential line or cylinderical surface 12 so that each half in cross-section is substantially semi-circular.

Each half is composed of a number of segments in substantially abutting or interlocking end-to-end relation. The segments lap or break joints in the respective halves, and the segments of the inner half are secured to those of the outer half by means of radial screws or bolts 13 having cylindrical heads 14 let into apertures 15 in bosses 16 cast on the segments of the inner core half, the stems of said screws engaging threaded apertures in complementary bosses 17 cast on the segments of the outer core half. Thus the screws 13 are normally contained within the circular body of the core and accessible upon the inner side of the latter for the purpose of connecting and disconnecting the segments of the inner and outer halves. The head of each screw is formed with a square socket 18, indicated in dotted lines in Fig. 2, for the reception of a suitable turning tool, and the screw is prevented from dropping out of the aperture 15, when the core is disassembled, by a retainer ring 19 which is held in place by small screws 20.

Each core half may be composed of any suitable number of segments, there being in this case three segments 21, 22, 23 in the outer core half, and three segments 24, 25, 26 in the inner core half. Two of the joints between the abutting ends of the segments of each core half are radial or "squared" and provided with semi-circular plates 27 which fill up the saw-cuts formed in the process of dividing each core half into parts from an originally continuous ring, and also act as wear-plates between the ends of the segments. The third joint in each core half is slanting or semi-tangent and provided with a filler or wear plate 27ª, the several wear plates 27 and 27ª being secured on the ends of their respective segments by means of small screws 29.

As a means of interlocking the ends of the abutting segments against relative lateral displacement, I show one end of each segment provided with a key 30 let into a slot therein and secured by transverse pins 31, the projecting end of said key entering a complemental slot formed in the end of the adjacent segment, but these keys may, if desired, be dispensed with, as the radial screws 13 will ordinarily maintain the desired alinement of the segments.

In the process of taking the core out of a tire casing, segment 24 of the inner core half will first have its screws 13 disconnected from the segments 21 and 23 of the outer core half, and swung inwardly about its squared end as a fulcrum, after which it is an easy matter to remove the remaining segments of the inner core half. This gives access to the outer core half, whose segment 21 is first removed in the manner just described for segment 24, after which the remaining segments 22 and 23 can readily be taken out.

I claim:

1. A collapsible core comprising inner and outer sections detachable along a circumferential line extending around the core, each of said sections being of semi-circular cross section and composed of a plurality of hollow segments having interlocking end to end connections.

2. A collapsible core, comprising inner and outer sections separably connected along a circumferential line extending around the core, each of said sections comprising a plurality of hollow segments of semi-circular cross section provided with interlocking end to end joints, the segments of one section adapted, when assembled to overlap the end joints of the segments of the other section.

3. A collapsible ring core comprising inner and outer sections detachable along a circumferential line extending around the core, each of said sections being of semi-circular cross-section and composed of a plurality of hollow segments having interlocking end to end connections, and means normally contained within the circular body of the core for detachably securing the segments of the inner section to the segments of the outer section, said means being accessible, for the purpose of disassembling the core parts, from the inner circumference of the ring core.

4. A collapsible core comprising inner and outer sections, each of said sections being of semi-circular cross section and comprising a plurality of hollow segments each of which is semi-circular in cross section and means for detachably securing the several parts together.

5. A collapsible core comprising an inner core section composed of a plurality of hollow segments adapted to be placed end to end, and an outer core section similarly composed of a plurality of hollow core sections adapted to be placed end to end, and means for detachably securing the segments of the outer core section to the segments of the inner core section to form an assembled hollow ring core of circular cross section.

6. A collapsible core comprising an inner and outer section, each of substantially semi-circular cross section, said inner and outer sections each comprising a plurality of segments, and means for detachably securing the segments of the inner section to the segments of the outer section, in such manner as to enable the removal of the inner segments first when the core is disassembled.

7. A collapsible ring core comprising inner and outer sections separably connected along a circumferential line extending around the core, each of said sections composed of a plurality of hollow segments of semi-circular cross section, means for detachably securing the segments of the inner section to the segments of the outer section, and semi-circular wear plates interposed between the adjacent segments of the inner and outer sections.

8. A collapsible tire-making core whose tire-making body is composed of concentric inner and outer segmental rings, the segments of one ring being overlapped upon adjoining segments of the other ring, and having means detachably connecting them therewith to lock the parts against circumferential separation.

9. A collapsible core comprising concentric inner and outer segmental rings, the inner-ring segments overlapping the joints of the outer ring and being respectively connected to the latter's segments on either side of each joint so as to tie the whole core together, the connecting means including a series of fastening devices accessible from the inner periphery of the core.

10. A collapsible core comprising a segmental outer ring, a concentric segmental inner ring whose segments overlap those of the outer ring and serve detachably to tie the same together; and radial screws forming part of the tying means and having their heads accessible from the inner periphery of the core.

11. A collapsible core comprising concentric inner and outer segmental rings forming an annulus, screws in the segments of the inner ring engaging the segments of the outer ring, and means for retaining said screws in the inner segments when unscrewed.

In testimony whereof I have hereunto set my hand this 22nd day of July, 1916.

FRANCIS B. CONVERSE.